Feb. 6, 1951  R. K. MEAD ET AL  2,540,590
CONTROL SYSTEM
Filed Oct. 7, 1944  2 Sheets-Sheet 1
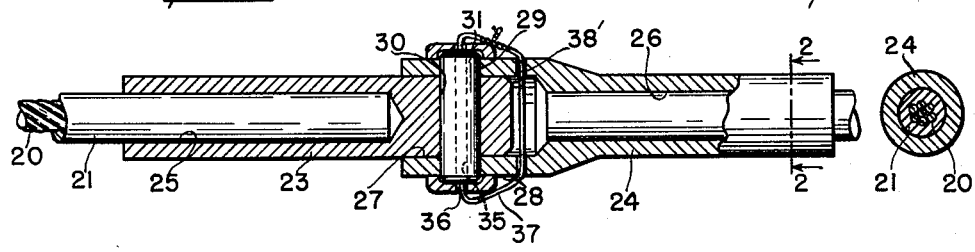
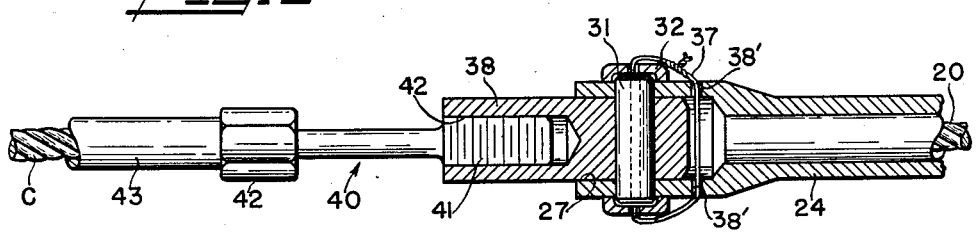
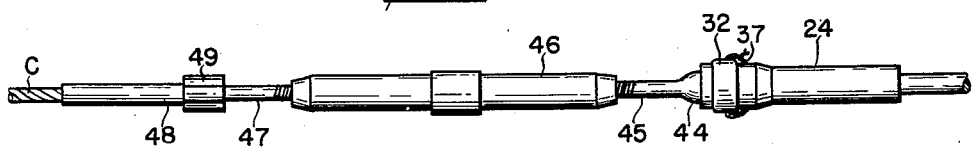
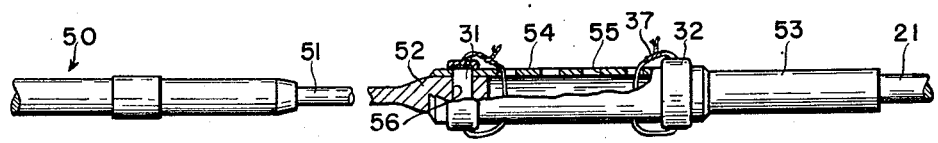
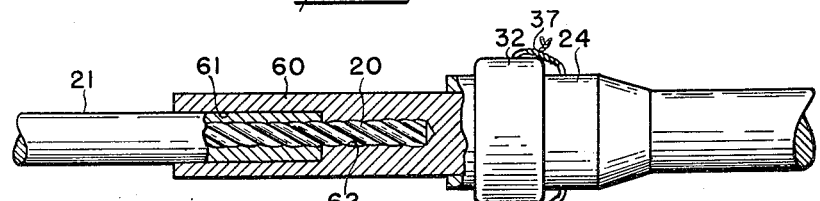
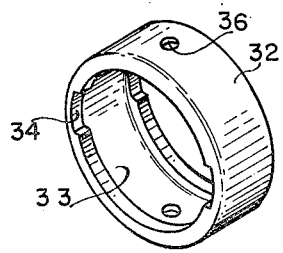
INVENTORS.
RALPH K. MEAD
& DONALD E. SLATON
BY George C. Sullivan
AGENT

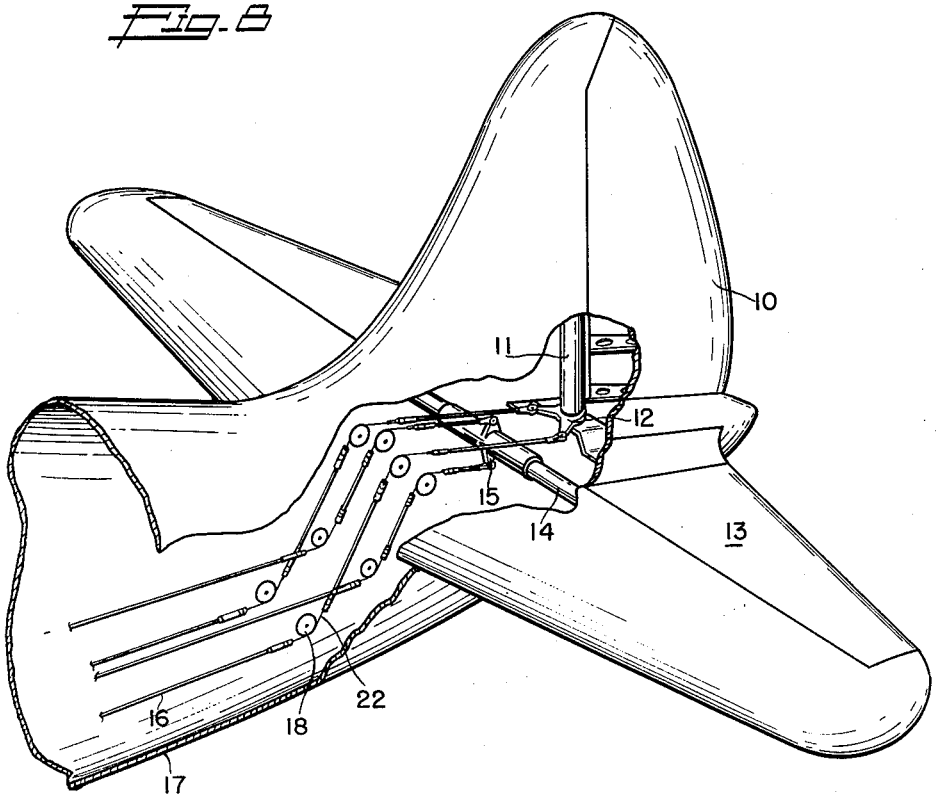

Patented Feb. 6, 1951

2,540,590

UNITED STATES PATENT OFFICE 2,540,590

CONTROL SYSTEM

Ralph K. Mead and Donald E. Slaton, Glendale, Calif., assignors to Lockheed Aircraft Corporation, Burbank, Calif.

Application October 7, 1944, Serial No. 557,708

5 Claims. (Cl. 287—75)

This invention relates to control systems and has more particular reference to control systems for use in aircraft.

The patent to C. F. Beed, 2,308,669, January 19, 1943, discloses a composite tension member or cable comprising a core of ferrous metal strands, and a sheath of aluminum alloy, or the like, bonded with the core as a result of a swaging operation. This composite type of cable has certain characteristics which particularly adapt it for employment in airplane controls, and it has found extensive application in that field. The composite cable has a thermal coefficient of linear expansion more closely conforming to the thermal coefficient of expansion of modern airplane structures than conventional steel cables. As a result, temperature variations cause markedly less slack in the cable system so that a more uniform tension may be maintained in the system and the natural frequencies of the control surfaces remain substantially constant to reduce the possibility of flutter. The composite cable also has a very low stretch factor, assuring a smoother, more positive action and giving the pilot a better sense of "feel" of the control system. In addition to the above advantages, the composite cable has a higher ultimate strength than conventional cables of comparable size with obvious attendant advantages, and its sheath protects the steel cable core against corrosion.

In employing the above referred to composite cable in aircraft control systems it is necessary, as with conventional cables, to embody couplings, turnbuckles and other fittings in the system. Where a coupling or fitting is incorporated in a control system embodying the composite cable, it has been the practice to terminate the aluminum alloy sheath at a point some distance ahead of the fitting and then swage the fitting directly onto the exposed steel core or cable. This mode of securing the fittings leaves considerable portions of the steel cable exposed and subject to corrosion, increases the stretch factor of the system and increases the differential in the coefficients of linear expansion of the airplane structure and control system.

A general object of the present invention is to provide a control system embodying practical, effective couplings and fittings for use with composite cable of the character above mentioned which are swaged or bonded directly to the sheath of the cable, whereby the inner steel cable core may remain covered and sealed against corrosion throughout its entire length. The fittings of the invention, in addition to permitting the employment of an entirely sealed cable, allow the maximum use of the composite cable sections in the control system to thereby reduce cable deflection to a minimum, reduce the stretch factor of the system and reduce the differential between the coefficients of linear expansion of the airplane and control system.

Another object of the invention is to provide couplings and fittings which may be directly swaged onto the sheath of the composite cable and which are constructed and proportioned to have sufficient swaged engagement with the sheath to assure the development of ample shear strength in the relatively soft material of the sheath. The tubular cable receiving portions of the fittings are designed and proportioned to have swaged or bonded engagement with extensive areas of the aluminum alloy sheath so that substantial portions of the sheath act under shear for the dependable transmission of the control system loads between the fitting and the stranded ferrous metal core of the cable.

Another object of this invention is to provide fittings or couplings of the class mentioned that may be employed to couple adjacent lengths of the composite cable or to connect the composite cable with plain or conventional cable, and the present couplings are also suitable for use in conjunction with standard types of fittings, adaptors, turnbuckles, etc.

It is another object of the invention to provide fittings of the class above referred to which embody sturdy, dependable and compact shear pin connections between the male and female coupling members. These shear pin connections are easily and quickly made up and their outside diameters, when fully assembled, are less than those of standard couplings.

A further object of the invention is to provide a fitting or coupling assembly of the general character referred to above embodying simple effective means for obtaining stage adjustment or approximate adjustment of the cable system whereby a single turn-buckle may be all that is required in the entire cable system. The adjustment means of the fitting permits a rapid approximate adjustment of the system and subsequent manipulation of a single turnbuckle will suffice to obtain the final accurate adjustment of the system. In many installations the range of adjustment of the turnbuckles is quite limited which necessitates cutting the cable with great accuracy to obtain a final overall length of cable system capable of adjustment by means of the turnbuckle. The adjustment means of the invention has a substantial range of adjustment making it unnecessary to use such a high degree of accuracy when cutting the cable sections to length.

A still further object of the invention is to provide a type of fitting or coupling in which the tubular cable receiving portions are swaged directly onto both the aluminum alloy sheath and an exposed portion of the ferrous metal cable core. In addition to the type of coupling wherein the coupling parts are swaged directly onto substantial portions of the aluminum alloy sheath, the invention provides a type of coupling or fitting for use where limited end portions of the stranded cable core are laid bare and the coupling parts are swaged onto the exposed core as well as the cable sheath, whereby a substantial portion of the loading is transmitted directly to the cable core. In this type of coupling the bared parts of the stranded cable core are confined entirely within the coupling, and there are no bare or exposed ferrous metal parts subject to corrosion. The swaged portions of this form of coupling need not be as long as in the type of coupling that is swaged solely to the sheath of the composite cable.

Other objects and features of the invention will be readily understood from the following detailed description of a typical preferred form of the invention wherein reference will be made to the accompanying drawings in which:

Figure 1 is a longitudinal detailed sectional view of a fitting or coupling of the invention for connecting two lengths of composite cable;

Figure 2 is a transverse sectional view taken as indicated by line 2—2 on Figure 1;

Figure 3 is a view similar to Figure 1 illustrating an arrangement for connecting a composite cable and a conventional cable;

Figure 4 is a reduced side elevation of an assembly embodying a turnbuckle and serving to connect a composite cable and a conventional cable;

Figure 5 is a side elevation of an assembly for connecting two sections of composite cable and embodying a tension adjusting means, with certain parts appearing in longitudinal cross section;

Figure 6 is a side elevation of a fitting or coupling similar to that shown in Figure 1 with a portion appearing in longitudinal cross section to illustrate the manner in which the fitting member is swaged onto the core as well as the sheath of the composite cable;

Figure 7 is a perspective view of the retainer ring of the invention; and

Figure 8 is a fragmentary perspective view illustrating a portion of the control system of an airplane embodying the fittings of the invention.

In Figure 8 we have illustrated a typical application of the invention wherein a control system operates the surfaces of an airplane empennage. The rudder 10 is operated by a torque tube 11 provided with a yoke or fork 12. The horizontal control surfaces 13 are operated by a similar tube 14 carrying levers or arms 15. The control cables 16 are operatively connected with the yoke 12 and arms 15, and extend forwardly through the fuselage 17 of the airplane. Appropriately positioned pulleys 18 direct the individual cables 16. It may be assumed that the cables 16 are principally made up of the above-referred to type of composite cable and are provided with the fittings and couplings of the invention. It is to be observed that the portions of the cable systems which operate over the pulleys 18 are flexible and these portions may be of conventional steel cable.

Each length or section of the composite cable comprises a core 20 of stranded steel wire, the strands being made up of multiplicities of spirally wound wires. A sheath 21 of aluminum or aluminum-containing metal surrounds the core 20. The sheath 21 is initially tubular and is slipped over the cable 20. The sheath 21 is swaged onto the core 20 throughout the length of the cable section. The swaged sheath 21 compacts the strands of the core 20, and the swaging operation effectively bonds the sheath with the core. The swaging operation causes the metal of the sheath 21 to occupy the spaces and grooves occurring between the adjacent strands of the core 20 and compacts the core so that the outside diameter of the composite cable is proportionately reduced. The composite cable has a limited degree of flexibility and may be successfully operated through fairleads where the change in direction is gradual, but where a substantial or abrupt change in direction is required, conventional unsheathed cable is incorporated in the system at the zones where such directional changes occur. Thus in Figure 8, the cable sections 22 which operate over the pulleys 18 are of the usual flexible cable, whereas the remaining portions illustrated are made up of the composite cable. Figures 1 to 7 inclusive illustrate couplings and fittings useful in control systems such as shown in Figure 8, and these devices will be described in detail below.

Figures 1, 2 and 7 illustrate a fitting or coupling suitable for directly connecting two lengths or sections of the composite cable. The coupling comprises a male member 23 and a female member 24 adapted to be swaged onto their respective cable sections, and formed to have telescopic engagement one with the other. The members 23 and 24 are formed of a material suitable for swaging, such as steel or a ferrous alloy. The male member 23 is an elongate cylindrical part of substantially uniform outside diameter. The member 23 is tubular for a substantial portion of its length, having a longitudinal opening 25 entering its outer end. The opening 25 is initially of ample diameter to receive the sheath 21 of the related composite cable.

The female member 24 is an elongate tubular part enlarged at its inner portion to receive an end part of the member 23. A longitudinal opening 26 extends through the major portion of the member 24 to receive the related composite cable. The opening 26 joins a socket 27 of increased diameter formed in the enlarged inner end portion 28 of the member. The socket 27 is proportioned to rather accurately receive the end part of the male member 23. It is to be noted that the coupling members 23 and 24 are both simple integral parts.

The members 23 and 24 are rigidly and permanently secured to their respective composite cables. In accordance with the invention, the members are directly and intimately bonded to the cables by swaging operations. Following the insertion of the sheathed cables into the openings 25 and 26, the tubular major portions of the members 23 and 24 are swaged on the cables. The swaging operations may be performed in any appropriate manner, but are preferably such as to assure uniform bonding of the sheaths 21 and the members 23 and 24 throughout the circumferences of sheaths and throughout the extent of axial penetration of the cables into the fitting members. The extent of the swaged engagement or bonded contact between a coupling member, and its composite cable is sufficient to develop ample shear strength in the relatively soft material of the cable sheath 21 to dependably transmit the maximum loads which may be imposed on the control system. To obtain the required area of swaged engagement it may be necessary to make the swaged portions of the coupling members 23 and 24 somewhat longer than the equivalent portions of conventional couplings and fittings.

The invention provides easily made up, yet thoroughly dependable means for connecting the male and female members 23 and 24. The enlarged socketed portion 28 of the female member 24 has a transverse opening 29 for communicating with a similar transverse opening 30 in the solid or non-tubular inner end portion of the male member 23. When the male member 23 is inserted in the socket 27, the members are turned and shifted axially with respect to one another to bring their openings 29 and 30 into register. A coupling pin 31 is then inserted into the aligned openings. The pin fully occupies the openings, and in practice may have a close fit in the opening 29 of the member 24. As best illustrated in Figure 1 of the drawings, the pin 31 is of sufficient length to project slightly from the periphery of the enlarged portion 28 of the member 24 at both ends of the opening 29. This projection of the pin 31 assures the development of the full shear strength of the pin.

The means for connecting the fitting members 23 and 24 further includes a retainer ring 32; see Figures 1 and 7. The ring, when brought to the operative position, surrounds the enlarged portion 28 of the member 24. An internal annular groove 33 is formed in the ring 32 and is proportioned to receive the protruding end portions of the pin 31. Two diametrically opposite axially extending grooves 34 are provided in the ring 32 to partially intersect the annular groove 33. The notches or grooves 34 are proportioned to receive the projected ends of the pin 31. When the ring 32 is turned to a position where its axial grooves 34 are aligned with the pin 31, the ring is shifted along the member 28 to have the grooves 34 receive the projecting ends of the pin 31. The retainer ring 32 is stopped in a position where the end parts of the pin are received in the annular groove 33 and the ring is then turned to move the axial grooves 34 out of alignment with the pin. The walls of the annular groove 33 prevent endwise movement of the pin 31 and the ring 32 thus holds the pin against displacement from its openings 29 and 30. The end walls of the annular groove 33 engage the projecting parts of the pin 31 to prevent axial movement of the retainer ring.

Means is provided for holding the retainer ring 32 against rotary movement in the position where its axial grooves 34 are out of alignment with the pin 31 so that the ring positively prevents displacement of the pin from its openings 29 and 30. The pin 31 has a small diametered axial bore 35 and two diametrically opposite radial openings 36 are formed in the wall of the retainer ring 32. The radial openings 36 are spaced substantially 90° from the axial grooves 34. When the retainer ring 32 is in the rotative position where its openings 36 are in alignment with the pin opening 35, a safety wire 37 is inserted through the openings. A small diametered diametric opening 38' may be provided in the enlarged portion 28 of the member 24 to intersect the socket 27 adjacent to its inner end and the safety wire 37 may be trained through the opening 38' as well as through the openings 35 and 36 to form a loop. It is to be understood that the safety wire 37 may be arranged and secured in other manners. The safety wire 37 dependably prevents turning of the retainer ring 32 and holds the ring in the position where the connecting pin 31 is positively held against loss or displacement.

It is to be observed that with the fitting or coupling just described, the two composite cable sections are directly and dependably connected through the medium of the members 23 and 24 and the pin 31. The pin 31 is definitely retained in its openings 29 and 30 by the retainer ring 32, which in turn is secured in place by the safety wire 37. Accordingly, there is no possibility of the fitting becoming disconnected during use. However, if it is desired to disconnect the adjacent cable sections, the safety wire is removed and the ring 32 is turned 90° to bring the axial grooves 34 into alignment with the pin 31. The ring 32 is then shifted axially, whereupon the pin 31 may be pushed from the openings 29 and 30 to free the two cable sections and their respective fittings. In practice, the composite cable may be produced in sections of rather limited length and the fittings of Figures 1 and 2 may be employed in connecting a plurality of such cable sections to form an elongate composite cable system or assembly. Where conditions permit, an entire system may be made up of the composite cable sections connected by the fittings of the invention without resorting to the use of weaker conventional cables. Furthermore, there is no possibility of corrosion of any part of the full composite cable system, and accordingly, there is no need to periodically inspect the system for corrosion or wear.

Figure 3 illustrates a fitting useful in connecting a composite cable and a standard or conventional cable C. The fitting includes a female member 24 which may be identical with the member 24 of Figure 1. The major portion of the member 24 is swaged onto the sheath 21 of the composite cable, and the socket 27 of the member receives a male member 38. Th members 24 and 38 are connected by the pin 31 engaged in openings 29 and 30, and retained by the ring 32 provided with the safety wire 37, all as described above. An adaptor 40 has a head or enlarged portion 41 screw threaded into a socket 42 formed in the outer end of the male member 38. The adaptor 40 may have a polygonal portion 42 to facilitate its engagement by a wrench. The outer portion 43 of the adaptor 40 is tubular to receive the conventional cable C and is swaged onto the cable in accordance with the usual practice. It will be apparent that the male member 38 of the coupling may receive threaded adaptors of various lengths and types.

Figure 4 illustrates an arrangement wherein a turnbuckle is connected between a composite cable and a conventional steel cable C. This combination includes a female member 24 which may be identical with the member 24 of Figure 1. A male member 44 is received in the socket 27 of the member 24 and the two members are connected by the pin 31 and the retainer ring 32 described in detail above. The male member 44 has an extension 45 of reduced diameter which forms a bolt or rod. This rod 45 is screw threaded in one end of the turnbuckle barrel 46. The rod end 47 of an adaptor-like member 48 is screw threaded in the opposite end of the barrel 46 to complete the turnbuckle assembly. The member 48 has a polygonal wrench receiving part 49. In the particular case illustrated, the member 48 receives the conventional cable C and is swaged thereon to be rigid therewith. It will be apparent that where the turnbuckle is connected between two lengths of the composite cable, a female member 24 may be swaged onto each cable and rod members 45 equipped with the male parts 44 may be engaged in the sockets 27 of the female members.

Figure 5 illustrates a combination embodying a turnbuckle 50 and a device for obtaining rapid approximate adjustment of the cable tension. This combination may be connected between two composite cables, or between a composite cable and a conventional cable, or between two conventional cables. A rod 51 is screw threaded in one end of the turnbuckle barrel, and has an enlarged end portion 52 resembling the male member 23. A similar rod may be threaded in the other end of the turnbuckle barrel, or where the turnbuckle is to be connected with a conventional cable C, a member similar to the rod 47 may be threaded in said other end of the turnbuckle. A male member 53 which may be identical with or similar to the member 23, is swaged onto the sheath 21 of the composite cable. The enlarged portion 52 of the turnbuckle rod and the end of the male member 53 enter the opposite ends of a tube 54.

The tube 54 is preferably of uniform diameter and may be of any selected length. The part 52 and member 53 are slidably received in the tube. A plurality of longitudinally spaced transverse or diametric openings 55 are provided in the tube 54. The enlarged rod portion 52 and the male member 53 have transverse openings 56 similar to the above described opening 30 of Figure 1, and these openings are adapted to register with selected openings 55 of the tube 54. Pins 31 are engaged in the openings 55 and 56 and retainer rings 32 engage around the tube 54 to retain the pins in their openings. The retainer rings 32 may be safety-wired to the tube 54. The pins 31 and the rings 32 may be identical with the corresponding elements of Figure 1. When it is desired to adjust the tension in the cable system, the pin 31 which secures the male member 53 to the tube 54 is withdrawn and the member is moved inwardly or outwardly to a new position, whereupon the pin 31 is re-inserted in the openings 55 and 56. The retainer ring is then arranged to lock the pin in its openings and the ring is safety-wired to the tube 54. If desired or necessary, the rod member 51 may be adjusted and resecured to the tube 54 in the same way. Following such preliminary adjustment, the turnbuckle 50 may be employed to obtain the final accurate adjustment of the tension in the control system.

In Figure 6 there is illustrated a modified form of construction suitable for use in any of the several embodiments and applications of the invention. Where this structure is employed, the sheath 21 is stripped or removed from an end portion of the composite cable to leave an end part of the cable core 20 exposed. The remaining portion of the sheath 21 is left undisturbed. In practice it is necessary to remove only a relatively short length of the sheath 21 from the end of the composite cable section. The fitting member 60 which receives the cable has a bore or opening 61 for receiving the sheath 21 and has an opening 62 of reduced diameter continuing inwardly from the bore 60 and adapted to receive the exposed end portion of the cable core 20. When the cable has been properly inserted in the openings 61 and 62, the member 60 is swaged onto the cable. This swaging operation results in an effective direct bond and connection between the member 60 and the steel core 20 of the cable, and also results in a secure connection between the member 60 and the sheath 21 of the cable. Accordingly, the operating loads are transmitted in part directly to the cable core 20 and in part indirectly from the member 60 through the sheath 21 to the cable core 20. Where there is a direct swaged connection between the member 60 and the core 20, the swaged part of the member 60 may be somewhat shorter than in the other embodiments of the invention. Sufficient strength is developed in the shorter member 60 by reason of the direct swaged connection between the member and the core 20 supplemented by the swaged connection between the member 60 and the sheath 21. It is to be observed that the stripped end portion of the core 20 is completely protected and sealed in the member 60 by reason of the swaged engagement between the member 60 and the sheath 21, and the exposed core portion is not subject to corrosion or flexure. Accordingly, this type of construction has the advantages of a direct swaged connection between the fitting and the cable core without the disadvantages of such an arrangement as heretofore employed. It is to be understood that the fitting member 60 may be any one of the several coupling or fitting elements of the invention. In the particular case illustrated, the member 60 is the male element engaged in the socket of a female member 24 and secured therein by the pin and ring arrangement 31—32 described in detail above.

Having described only typical forms of the invention, we do not wish to be limited to the specific details herein set forth, but wish to reserve to ourselves any variations or modifications that may appear to those skilled in the art or fall within the scope of the following claims.

We claim:

1. A control system comprising two composite cables each including a core of high tensile strength and a sheath of less tensile strength, a fitting member swaged onto the sheath of each cable, the members fitting one within the other and having transverse openings, a pin engaged in said openings to connect the members and having its ends projecting beyond the periphery of the outermost member, and means for preventing displacement of the pin from the openings including a ring arranged around the members and having an internal groove which receives said projecting ends of the pin.

2. A control system comprising two composite cables each including a core of high tensile strength and a sheath of less tensile strength, a fitting member swaged onto the sheath of each cable, the members fitting one within the other and having transverse openings, a pin engaged in said openings to connect the members, and means for preventing displacement of the pin from the openings including a ring fitting around the members and engaged over the ends of the pin, and a part engaged with the ring and a fitting member for holding the ring in place.

3. A control system comprising two composite cables each including a core of high tensile strength and a sheath of less tensile strength, a fitting member swaged onto the sheath of each cable, the members fitting one within the other and having transverse openings, a removable pin arranged in said openings to connect the members, the pin having its end portions projecting beyond the periphery of the outermost member, a ring on the outermost member having a circumferential internal groove for receiving the projecting end portions of the pin and axial internal grooves for admitting the end portions of the pin into the circumferential groove, and means for holding the ring in an angular position where the axial grooves are out of alignment with the projecting ends of the pin.

4. A control system comprising two composite cables each including a core of high tensile strength and a sheath of less tensile strength, a fitting member swaged onto the sheath of each cable, the members fitting one within the other and having transverse openings, a removable pin arranged in said openings to connect the members, the pin having its end portions projecting beyond the periphery of the outermost member, a ring on the outermost member having a circumferential internal groove for receiving the projecting end portions of the pin and axial internal grooves for admitting the end portions of the pin into the circumferential groove, and safety wire means for retaining the ring in an angular position where the axial grooves are offset from the projecting ends of the pin.

5. A control system comprising two cables, fitting members on adjacent ends of the cables, one member having a socket, the other member extending into the socket, the members having aligned transverse openings, a pin inserted in the openings to connect the members, the pin having parts projecting from the socketed member, a ring on the socketed member having a circumferential internal groove for receiving the end parts of the pin and axial grooves for admitting said parts to the circumferential groove, and means for holding the ring in the angular position where the axial grooves are out of alignment with the pin so that the ring prevents displacement of the pin.

RALPH K. MEAD.
DONALD E. SLATON.

REFERENCES CITED

The following references are of record in the file of this patent:

UNITED STATES PATENTS

| Number | Name | Date |
|---|---|---|
| 851,068 | Cowell | Apr. 23, 1907 |
| 1,121,736 | Lee et al. | Dec. 22, 1914 |
| 1,155,895 | Davis | Oct. 5, 1915 |
| 1,515,131 | Ott | Nov. 11, 1924 |
| 1,643,110 | Briggs | Sept. 20, 1927 |
| 1,793,293 | Varney et al. | Feb. 17, 1931 |
| 1,871,839 | Carter | Aug. 16, 1932 |
| 1,886,086 | Damon | Nov. 1, 1932 |
| 2,109,114 | Kerr, Jr. | Feb. 22, 1938 |
| 2,152,397 | Brickman et al. | Mar. 28, 1939 |
| 2,291,253 | Osborn | July 28, 1942 |
| 2,308,669 | Beed | Jan. 19, 1943 |
| 2,326,317 | Amtsberg | Aug. 10, 1943 |